(12) United States Patent
Cundiff et al.

(10) Patent No.: US 11,467,031 B2
(45) Date of Patent: Oct. 11, 2022

(54) PATH FLUCTUATION MONITORING FOR FREQUENCY MODULATED INTERFEROMETER

(71) Applicant: THE REGENTS OF THE UNIVERSITY OF MICHIGAN, Ann Arbor, MI (US)

(72) Inventors: Steven T. Cundiff, Ann Arbor, MI (US); Chris Smallwood, Ann Arbor, MI (US); Eric Martin, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 17/056,225

(22) PCT Filed: May 17, 2019

(86) PCT No.: PCT/US2019/032847
§ 371 (c)(1),
(2) Date: Nov. 17, 2020

(87) PCT Pub. No.: WO2019/222614
PCT Pub. Date: Nov. 21, 2019

(65) Prior Publication Data
US 2021/0231495 A1 Jul. 29, 2021

Related U.S. Application Data

(60) Provisional application No. 62/673,181, filed on May 18, 2018.

(51) Int. Cl.
*G01J 3/02* (2006.01)
*G01J 3/45* (2006.01)
*G01J 9/02* (2006.01)

(52) U.S. Cl.
CPC ............... *G01J 3/0297* (2013.01); *G01J 3/45* (2013.01); *G01J 9/02* (2013.01)

(58) Field of Classification Search
CPC ............... G01J 3/0297; G01J 3/45; G01J 9/02
See application file for complete search history.

(56) References Cited

U.S. PATENT DOCUMENTS

| 5,106,191 A | 4/1992 | Ohtsuka |
| 5,781,294 A | 7/1998 | Nakata et al. |

(Continued)

FOREIGN PATENT DOCUMENTS

| CN | 1497247 A | 5/2004 |
| CN | 102047071 A | 5/2011 |

(Continued)

OTHER PUBLICATIONS

International Search Report and Written Opinion of the International Searching Authority issued in PCT/US2019/032847, dated Aug. 6, 2019; ISA/US.

(Continued)

*Primary Examiner* — Violeta A Prieto
(74) *Attorney, Agent, or Firm* — Harness, Dickey & Pierce, P.L.C.

(57) ABSTRACT

A method is presented for determining path length fluctuations in an interferometer using a reference laser with an arbitrary frequency with respect to the measured light. The method includes: injecting reference light along signal paths of the interferometer; measuring interference between the reference light at an output of the interferometer; determining an optical phase difference between the reference light in the two signal paths of the interferometer by measuring intensity modulation of the interference between the reference light and subtracting an intended frequency modulation from the measured intensity modulation; accumulating an (Continued)

unwrapped phase difference between the reference light in the two signal paths of the interferometer, where the unwrapped phase difference is defined in relation to a reference; and determining path length fluctuation of light in the interferometer using the unwrapped phase difference.

14 Claims, 5 Drawing Sheets

(56) References Cited

U.S. PATENT DOCUMENTS

| | | | |
|---|---|---|---|
| 5,838,485 | A | 11/1998 | de Groot et al. |
| 6,137,585 | A | 10/2000 | Hitzenberger et al. |
| 6,407,816 | B1 | 6/2002 | De Groot et al. |
| 6,958,817 | B1 | 10/2005 | Zhu et al. |
| 2001/0000978 | A1* | 5/2001 | Hitzenberger ....... G01B 11/255 356/484 |
| 2002/0140945 | A1 | 10/2002 | de Groot et al. |
| 2002/0145739 | A1* | 10/2002 | De Groot ............... G01B 11/06 356/503 |
| 2005/0105097 | A1 | 5/2005 | Fang-Yen et al. |
| 2008/0088846 | A1* | 4/2008 | Hayward ............. H04B 10/071 356/446 |
| 2008/0285041 | A1 | 11/2008 | Ocelic et al. |
| 2010/0150467 | A1* | 6/2010 | Zhao ................. G01N 21/4795 382/264 |
| 2010/0268499 | A1 | 10/2010 | Holzapfel |
| 2013/0148129 | A1 | 6/2013 | Warden et al. |
| 2014/0368832 | A1* | 12/2014 | Salvade ............. G01B 9/02081 356/497 |
| 2017/0168285 | A1* | 6/2017 | Ozcan .................. G03H 1/0443 |
| 2019/0226972 | A1* | 7/2019 | Javidi ................ G01N 15/1468 |

FOREIGN PATENT DOCUMENTS

| | | |
|---|---|---|
| CN | 102384716 A | 3/2012 |
| CN | 102607720 A | 7/2012 |
| CN | 103234461 A | 8/2013 |
| CN | 103698835 A | 4/2014 |
| CN | 107014289 A | 8/2017 |
| DE | 10038346 A1 | 6/2001 |
| GB | 2268582 A | 1/1994 |
| GB | 2442745 B | 4/2011 |
| JP | H07190714 A | 7/1995 |
| JP | H09196612 A | 7/1997 |
| JP | H09250902 A | 9/1997 |
| JP | 2003287403 A | 10/2003 |
| JP | 2006266796 A | 10/2006 |
| JP | 2008224394 A | 9/2008 |
| JP | 2009080038 A | 4/2009 |
| JP | 2009250786 A | 10/2009 |

OTHER PUBLICATIONS

Autry, T.M. et al., "Multidimensional coherent optical photocurrent spectroscopy of a semiconductor quantum well", Conference On Lasers And Electro-Optics (CLEO)—Laser Science To Photonic Applications, The Optical Society, Jun. 8, 2014, pp. 1-2, XP032707099, DOI: 10.1364/CLEO_QELS.2014.FTU1B.1.

Nardin, Gael et al., "Optical two-dimensional coherent spectroscopy of semiconductor nanostructures" Proceedings of SPIE, IEEE, US, vol. 9198, Sep. 5, 2014, pp. 91980Y-91980Y, XP060040537, DOI: 10.1117/12.2062608.

Yang Weiping, The research of ultrasonic signals demodulation technology in the laser heterodyne interference, Chinese Master's Theses Full-text Database (Engineering Science and Technology Chinese Master's Theses Full-text Database (Basic Sciences Chinese Master's Theses Full-text Database (Engineering Science and Technology I), (Aug. 15, 2016).

Li Zhidong et al., Movement Error Compensation in Frequency Scanning Interferometry for Absolute Distance Measurement, ACTA Optica Sinica, (Mar. 31, 2011).

* cited by examiner

PATH FLUCTUATION MONITORING FOR FREQUENCY MODULATED INTERFEROMETER

CROSS-REFERENCE TO RELATED APPLICATIONS

This application is a 371 U.S. National Phase of International Application No. PCT/US2019/032847, filed May 17, 2019 which claims the benefit of U.S. Provisional Application No. 62/673,181, filed on May 18, 2018. The entire disclosures of the above applications are incorporated herein by reference.

FIELD

The present disclosure relates to path fluctuation monitoring for frequency modulated interferometers or equivalently, frequency-shifted interferometers

BACKGROUND

A collinear embodiment of multidimensional coherent spectroscopy comprises two interferometers each of which splits an input pulse of light into a pair of pulses. Each of these pulses is frequency tagged using an acousto-optic modulator (AOM) so that it is possible to identify the four-wave-mixing signal for any specific pulse sequence of interest.

The new technology necessary for commercializing the above device can be simplified by considering just a single interferometer used to generate a pair of nearly identical pulses with some delay between the pulses. This pulse pair will be passed to an intensity detector. A frequency tagging component, like an AOM, in at least one arm will result in an interference term that causes the intensity at the detector to be modulated at the frequency difference between the two arms. This interference signal is called a beat note. By demodulating the signal on the intensity detector with the frequency difference between the two arms, one can measure the phase and amplitude of the interference.

The path length of one arm of the interferometer can be scanned with respect to the other. Recording the signal amplitude and phase as a function of the relative path length is a cross correlation of the two fields. For the phase measurements of each data point to be meaningful, it is necessary that the path fluctuations are small or are measured and either actively corrected or electronically subtracted out. The Fourier transform of this cross-correlation measurement gives the product of the two pulses' spectra.

For such an interferometer to work properly, it is necessary to know the exact frequency modulation difference and the path length difference between the two arms. Nominally, the frequency difference is the frequency applied to the AOM (or difference between two AOMs in each arm if two are used). However, due to Doppler shifting of the beam, when a mirror is moving or fluctuating, the frequency difference has additional dependences. The path length difference is also dependent on those fluctuations. Thus, the path length difference of the interferometer is measured with a second laser.

Historically, it is not uncommon to measure an interferometer with an additional laser for spectroscopy. There are many examples of using far detuned lasers to determine the path length separation in Fourier-transform infrared (FTIR) spectroscopy. However, these applications have not used a frequency modulating component in one or both arms of the interferometer. For FTIR, it is standard to use a He—Ne laser having a wavelength of 633 nm as a reference for spectrally resolving light having frequencies between 2000 and 20000 nm. In this case, without having to demodulate the signal, one just needs to use the zero-crossings of the reference laser interference to identify points spaced by that wavelength (typically 633 nm in these cases). For reference lasers that have a similar wavelength or a much longer wavelength than the signal it is not possible to sample the signal adequately with zero-crossings.

More recently, AOMs have been introduced to the interferometers for beam selectivity and improved noise cancellation. With frequency modulation, the standards techniques of path length measurement developed for FTIR do not apply. Instead, these methods rely on having a reference frequency very near the frequency of the light being measured. By keeping the reference spectrally near the measured light, the phase evolution with path length fluctuations is very small. This means that the demodulated interferometer is very insensitive to path length fluctuations.

This section provides background information related to the present disclosure which is not necessarily prior art.

SUMMARY

This section provides a general summary of the disclosure, and is not a comprehensive disclosure of its full scope or all of its features.

A method is presented for determining path length fluctuations in an interferometer, where one arm of the interferometer is frequency modulated with respect to the other arm of the interferometer. The method includes: injecting, by a reference laser, reference light along signal paths of the interferometer; measuring, by a detector, interference between the reference light at an output of the interferometer; determining, by a signal processor, an optical phase difference between the reference light in the two signal paths of the interferometer by measuring intensity modulation of the interference between the reference light and subtracting an intended frequency modulation from the measured intensity modulation; accumulating, by the signal processor, an unwrapped phase difference between the reference light in the two signal paths of the interferometer, where the unwrapped phase difference is defined in relation to a reference; and determining, by the signal processor, path length fluctuation of light in the interferometer using the unwrapped phase difference.

In one example, the interference is measured at a sampling rate that exceeds acoustic noise. In another example, the interference is measured at a sampling rate that exceeds two times the velocity of the path length changes divided by the wavelength of the reference light.

In one embodiment, accumulating an unwrapped phase difference includes detecting a change in sign of the optical phase difference; incrementing a counter by one in response to detecting a change in sign of the optical phase difference from a positive value to a negative value; and decrementing the counter by one in response to detecting a change in sign of the optical phase difference from a negative value to a positive value.

In one embodiment, path length fluctuation is determined by multiplying the unwrapped phase difference by the wavelength of the reference light and dividing the product by two times pi.

In another aspect, a spectroscopy system implements techniques for monitoring path fluctuation. The system includes: an interferometer having a frequency modulator in one of two optical paths; a reference laser source configured to inject reference light along the two optical paths of the interferometer; a detector configured to measure interference between the reference light at an output of the interferometer; and a signal processor interfaced with the detector. The signal processor determines optical phase difference between the reference light in the two optical paths of the interferometer based in part on the measured interference and accumulates an unwrapped phase difference between the reference light in the two optical paths of the interferometer.

More specifically, the signal processor determines optical phase difference between the reference light in the two signal paths of the interferometer by measuring intensity modulation of the interference between the reference light and subtracting an intended frequency modulation from the measured intensity modulation. The detector measures interference at a sampling rate that exceeds acoustic noise or at a sampling rate that exceeds two times the velocity of the path length changes divided by the wavelength of the reference light.

In one embodiment, the signal processor is a field-programmable gate array.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
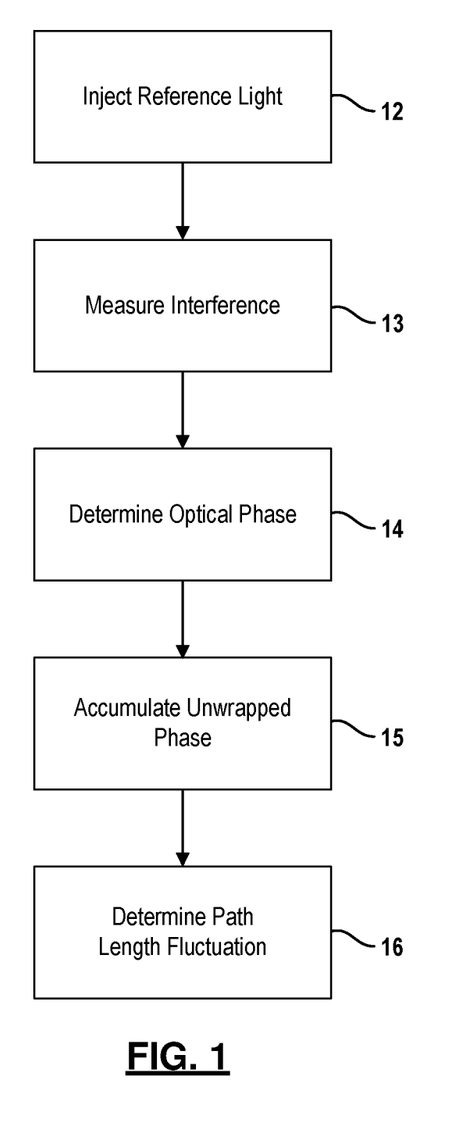
FIG. 1 is a flowchart depicting a method for monitoring path length fluctuations in a frequency-modulated interferometer.

FIG. 1 illustrates a method for monitoring path length fluctuations in a frequency-modulated interferometer. That is, one arm of the interferometer is frequency modulated with respect to the other arm of the interferometer. In the context of this disclosure, a frequency-modulated interferometer is understood to include the particular case of a frequency-shifted interferometer.

In order to measure an optical signal with phase sensitivity, it is necessary to sample path length fluctuations with a laser reference. Therefore, a reference light is injected at 12 along the signal paths of the interferometer by a reference laser. Rather than change the frequency of the reference light, a record of the path length difference is maintained for a reference laser having an arbitrary frequency with respect to the frequency of the measurement light as further described below.

Table 1 below illustrates how a detuned reference affects the measured signal if the methods disclosed here is not used to determine a corrected phase, and instead the measured reference phase is directly used to correct signal phase fluctuations.

| $\lambda_{ref}$ (nm) | $\delta\varphi_{sig} - \delta\varphi_{ref}$ (rad) | $\delta A$ (unity normalization) |
|---|---|---|
| 800 | 0 | 0 |
| 810 | 0.048 | 0.001 |
| 1064 | 0.974 | 0.438 |

For illustration purposes, the measurement signal has wavelength of 800 nm and path length fluctuations within the time of measurement are $\delta x=500$ nm. The second column of the table, $\delta\varphi_{sig}-\delta\varphi_{ref}$, indicates how well the reference fluctuations cancel the signal fluctuations. The amplitude of the measured signal is degraded by these phase fluctuations by a factor of $1-\delta A=\cos(\delta\varphi_{sig}-\delta\varphi_{ref})$. A reference having the same wavelength as the measurement signal could cancel fluctuations. A slightly detuned reference having a wavelength of 810 nm would nearly cancel all phase fluctuations of the reference and has negligible effect on the measured amplitude. However, a very detuned reference having a wavelength of 1064 nm would badly correct phase fluctuations and would underestimate the signal by over 40%.

Figure 2A:
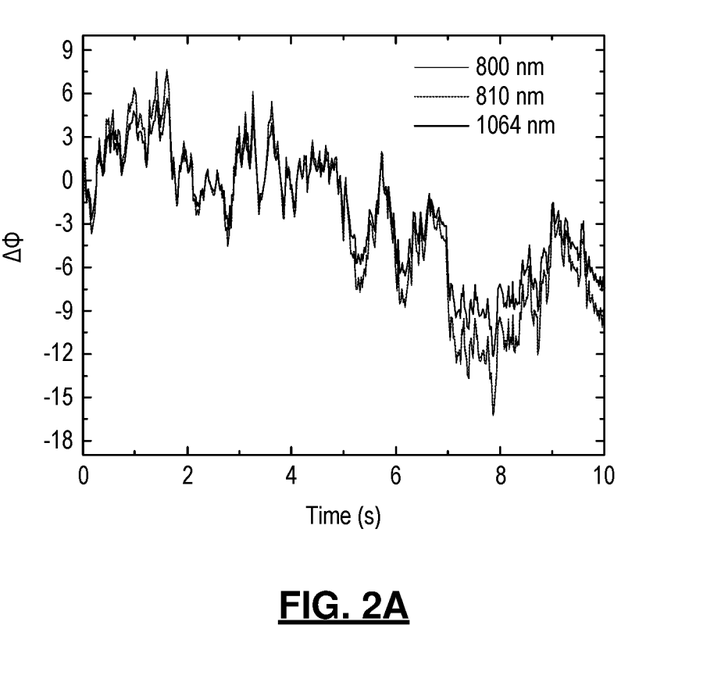
FIG. 2A is a graph illustrating the relative phase fluctuations as a function of time for various wavelengths of light in an interferometer.
Figure 2B:
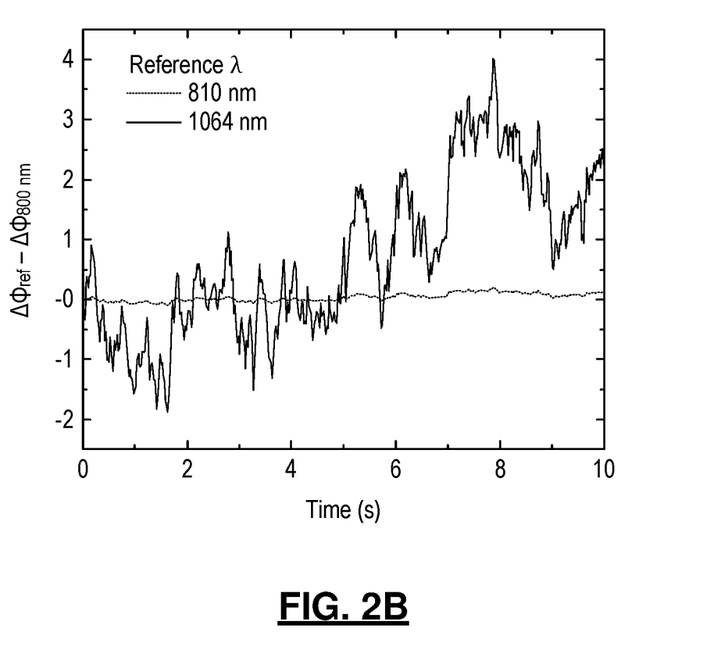
FIG. 2B is a graph illustrating that the measured phase of the signal will be wrong if the wavelength of the reference does not equal the wavelength of the measurement signal.

In FIG. 2A, phase fluctuations between two arms of an interferometer are plotted for the same simulated path length fluctuations with time. These are plotted for light having a wavelength of 800, 810, and 1064 nm. In FIG. 2B, the difference between these curves illustrates how incorrect a phase measurement could be after a few seconds. This means that for a reference at 810 nm cancelling fluctuations of an 800 nm signal, one would always measure a nearly correct phase. For a reference at 1064 nm, the phase could easily be measured incorrectly by over π (which corresponds to measuring a signal with the exact opposite sign of what it should have). It is thus apparent that one cannot do phase resolved spectroscopy using a far detuned reference and the standard phase cancellation scheme. The phase difference should not vary by more than 0.15 rad or else the data could be misinterpreted (using this rule one could define far detuned as greater than 30 nm, or 60 meV in energy units). Instead, it is necessary to consider the wavelength difference and scale the phase fluctuations with the reference wavelength.

Returning to FIG. 1, the interference between the reference light is measured at 13 at an output of the interferometer, for example by a detector. The interference is measured at a sampling rate that exceeds the acoustic noise of the system. In one embodiment, the interference is measured at a sampling rate that exceeds two times the velocity of the path length changes divided by the wavelength of the reference light.

The optical phase difference between the reference light in the two signal paths of the interferometer is then determined at 14 based in part on the measured interference. In the example embodiment, the optical phase difference is determined by measuring intensity modulation of the interference between the reference light and subtracting an intended frequency modulation from the measured intensity modulation.

Figure 3A:
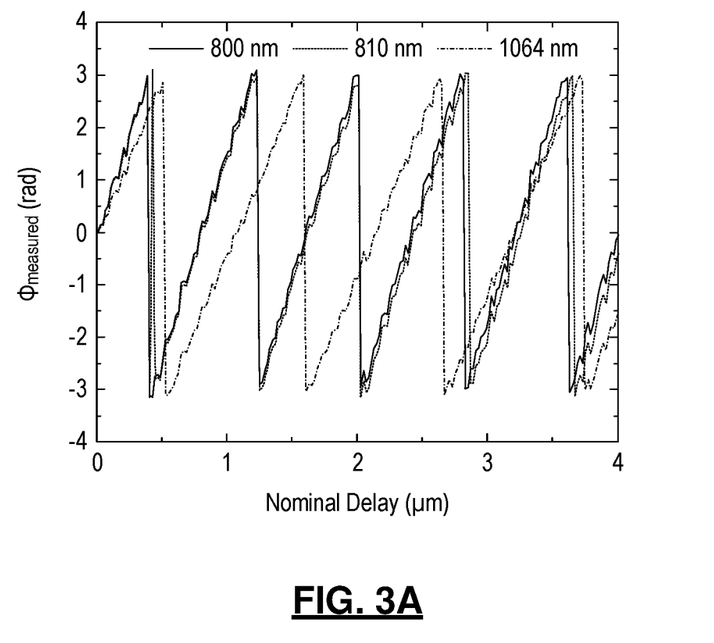
FIG. 3A is a graph illustrating wrapped phase of a signal.
Figure 3B:
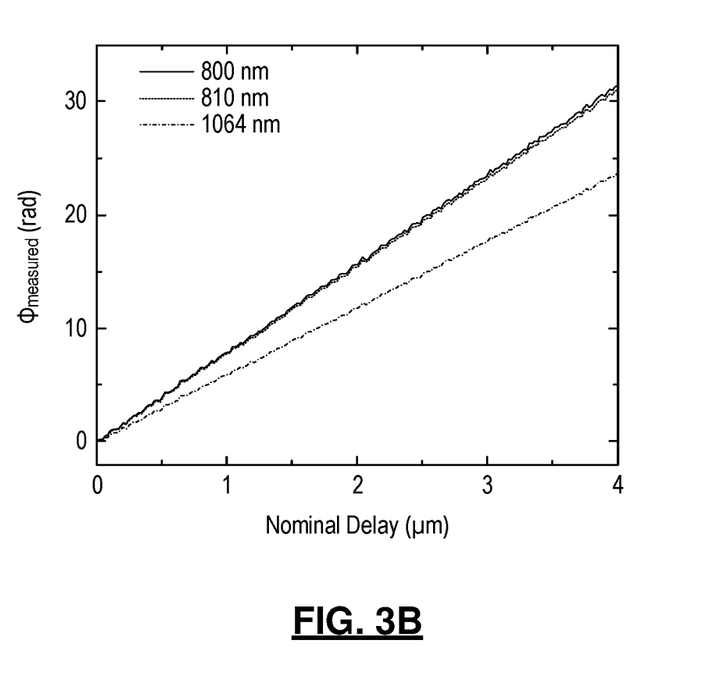
FIG. 3B is a graph illustrating the unwrapped phase of a signal.

One could naively think that multiplying the phase difference by the ratio of the reference wavelength and measurement signal wavelength would yield path length fluctuation. The problem is that one can only measure phase within a range of $2\pi$, at which point the phase wraps. In FIG. 3A, the measured relative phase between two arms of an interferometer in which one arm is intentionally delayed with respect to the other is plotted. In the figure, one can see the phase evolving as the delay is scanned, and the phase evolves differently for different wavelengths. Due to the phase wrapping, there is no simple way of correcting the phase without accumulating and/or recording the number of phase wraps between the delay and zero delay.

Accordingly, an unwrapped phase difference between the reference light in the two signal paths of the interferometer is accumulated at 15 by a signal processor. In the example embodiment, a counter for the number of phase wraps is maintained, for example using a field-programmable gate array. Each phase wrap is detected by a change in sign of the optical phase difference. In response to detecting a change in sign of the optical phase difference from a positive value to a negative value, the counter is incremented by one. In response to detecting a change in sign of the optical phase difference from a negative value to a positive value, the counter is decremented by one. Other techniques for tracking and/or accumulating the number of phase wraps are contemplated by this disclosure.

Path length fluctuation of light in the interferometer can be determined at 16 using the unwrapped phase difference. More specifically, the path length fluctuation is computed by multiplying the unwrapped phase difference by the wavelength of the reference light and dividing the product by two times pi, where the unwrapped phase difference at a given point in time is the phase difference determined from the measured interference summed with the phase indicated by the counter value at that given point in time. This calculated phase for any optimized wavelength is applied to the modulation frequency so that the modulated signal can be measured.

An alternative embodiment may use adaptive sampling. This is a different calculation that can be performed by an FPGA to also cancel path length fluctuations. For this approach, rather than cancelling the phase of the signal, the sampling rate of the signal is varied with the path length fluctuations. Thus, the signal is sampled every time the reference phase is incremented a finite amount. For instance, instead of sampling every 1 microsecond (corresponding to a 1 MSamples/s sampling clock), the signal is sampled when the phase evolves 0.001 radians (corresponding to a path length difference evolution of approximately 1 nm for a 1064 nm reference laser). Adaptive sampling would be accomplished by (1) locking the FPGA clock to the reference signal or (2) tracking the path length difference and sampling periodically. If (1) the FPGA clock is locked to the reference signal, it is essential that the delay stage move faster than the path length fluctuations so that the direction of travel is not ambiguous at any time. This method is therefore limited. If (2) path length tracking is used, the method described in 0036-0038 is used to determine the path length. By using adaptive sampling, path length fluctuations no longer contribute to phase noise because the interferometer signal evolves as a function of path length delay. If adaptive sampling is used in lieu of demodulation with an arbitrary reference, averaging of the signal should not be used because the signal will evolve very quickly, for reasons described in 0045. These types of solutions will therefore require larger data sets than the preferred embodiment.

Figure 4:
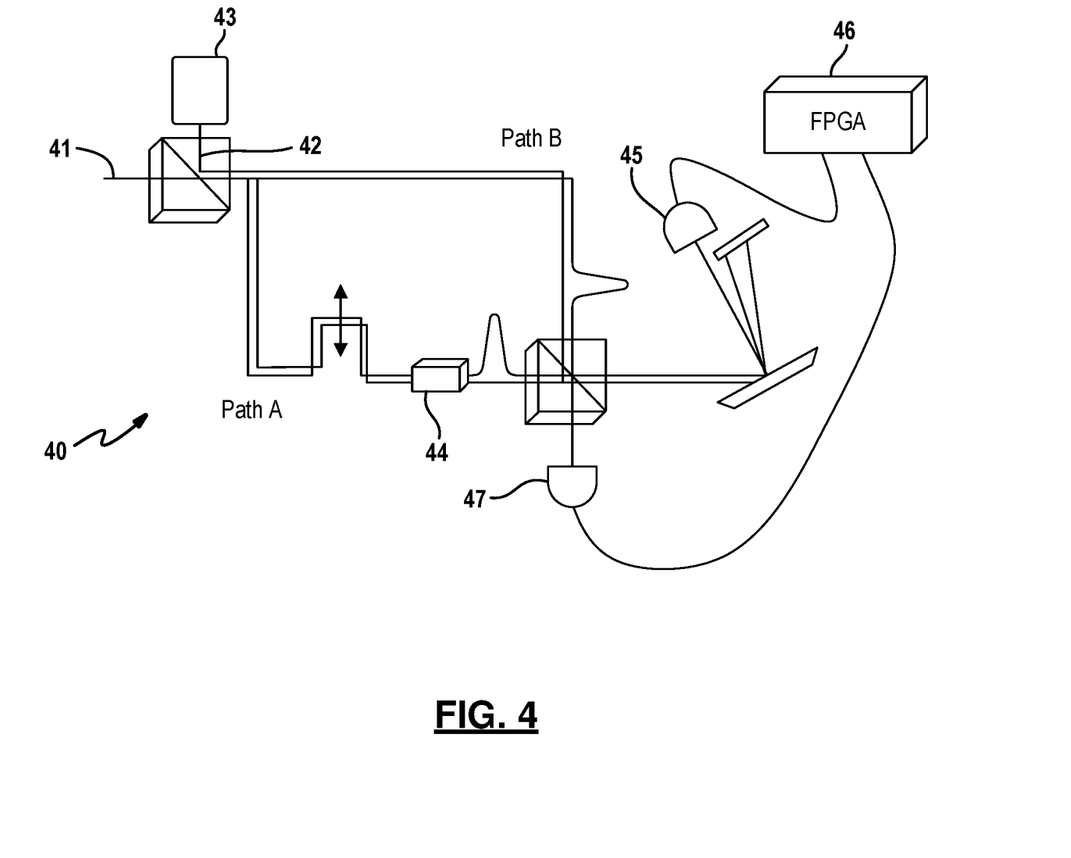
FIG. 4 is a diagram depicting an example frequency-modulated interferometer.

FIG. 4 depicts an example frequency-modulated interferometer 40. During operation, a measurement light beam 41 traverses the two light paths of the interferometer 40. A frequency modulator 44 is disposed in one of the light paths and is used to frequency tag the measurement light beam. In one embodiment, the frequency modulator 44 is an acousto-optic modulator although other types of modulators are contemplated by this disclosure. It is readily understood that the light traversing the two light paths can be split and/or combined using conventional optical components, such as beam splitters. A light detector 47 is used to measure the measurement light beam at output of the interferometer. The light detector 47 is in turn interfaced with a signal processor 46.

To measure the path fluctuations, a reference light is injected along the signal paths of the interferometer by a reference laser 43. The reference light is preferably a continuous wave. After traversing the two light paths, the reference light is recombined and directed to a second light detector 45. The second light detector is also interfaced with the signal processor 46. Based on the reference light measured by the second light detector 45, the signal processor 46 operates to determine path length fluctuations in an interferometer in the manner described above.

In an exemplary embodiment, the signal processor 46 is implemented as a microcontroller. In other embodiments, the signal processor 46 can be or can include any of a digital signal processor (DSP), microprocessor, microcontroller, or other programmable device which are programmed with software implementing the above described methods. It should be understood that alternatively the signal processor is or includes other logic devices, such as a Field Programmable Gate Array (FPGA), a complex programmable logic device (CPLD), or application specific integrated circuit (ASIC). When it is stated that the signal processor 46 performs a function or is configured to perform a function, it should be understood that signal processor 46 is configured to do so with appropriate logic (such as in software, logic devices, or a combination thereof). It is to be understood that the most relevant components have been discussed in relation to FIG. 4 but that other optic components may be needed to implement the system.

Figure 5:
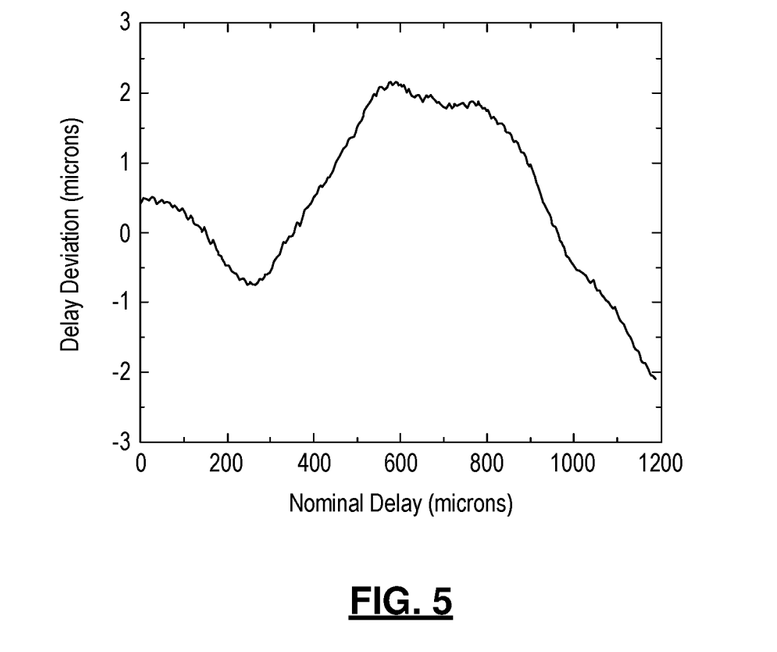
FIG. 5 is a graph illustrating the deviation of a measured delay from a nominal delay in the example embodiment of a frequency-modulated interferometer.

As proof of concept, the capability of the example embodiment described above was demonstrated. FIG. 5 illustrates the deviation of a measured delay in a frequency-shifted interferometer from a nominal delay. An optical delay stage is moved at a constant velocity to increase the nominal delay at a rate of 100 microns/second. The interferometer is measured with a reference laser having a wavelength equal to 1064 nm. Measurement of the actual phase evolution reveals that the delay deviates. The ability to calculate other reference signals depends on the accuracy of this phase measurement, as described above.

Figure 6:
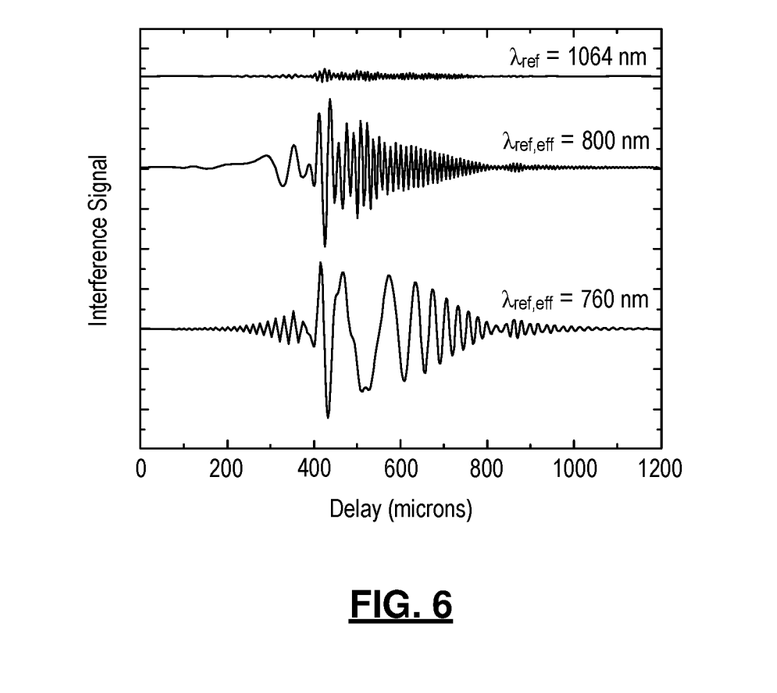
FIG. 6 is a graph illustrating the capability to calculate an arbitrary reference for demodulating a signal in the example embodiment of a frequency-modulated interferometer.

FIG. 6 demonstrates the capability of the example embodiment to calculate an arbitrary reference for demodulating a signal in a frequency-shifted interferometer. The figure contains three curves that each present the real part of the cross-correlation between a pulse pair split in an interferometer, where one arm of the interferometer passes through a dispersive medium. The pulses have a 60 nm bandwidth and a center wavelength of 760 nm. The actual reference laser has a wavelength of 1064 nm, and the interference of this laser passing through each arm of the interferometer is used to generate the electrical reference. The electrical reference modulation results from both the frequency shift and path length fluctuations of the interferometer. If the electrical reference signal is used without processing to demodulate the signal, the top curve (labeled 1064 nm) is measured. Because the signal has a very different frequency from the reference, it modulates very fast as the stage is moved. The demodulation parameters used for this detection example degrade the signal amplitude. An FPGA is used, in real time, to calculate the effective electrical reference that would be generated using a reference laser having a wavelength of 800 nm. Since the signal wavelength is closer to the calculated reference, and the frequency difference is much lower, the measured amplitude is more accurate. If the calculated reference is set at the same wavelength as the signal laser, the signal varies slowest, and the signal amplitude is greatest. Each of these curves were measured with the same actual 1064 nm reference laser, but a different reference is calculated using the path length measurement.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for determining path length fluctuations in an interferometer, where one arm of the interferometer is frequency modulated with respect to the other arm of the interferometer, comprising:
   injecting, by a reference laser, reference light along signal paths of the interferometer;
   measuring, by a detector, interference between the reference light at an output of the interferometer, thereby producing an electronic signal;
   subtracting, by a signal processor, phase of an applied frequency modulation from the measured electronic signal to thereby determine an optical phase difference between the reference light in the two signal paths of the interferometer;
   accumulating, by the signal processor, an unwrapped phase difference between the reference light in the two signal paths of the interferometer, where the unwrapped phase difference is defined in relation to a reference; and
   determining, by the signal processor, path length fluctuation of the reference light in the interferometer using the unwrapped phase difference.

2. The method of claim 1 wherein the reference light has a single frequency.

3. The method of claim 1 further comprise measuring interference between the reference light at a sampling rate that exceeds acoustic noise.

4. The method of claim 1 further comprises measuring interference between the reference light at a sampling rate that exceeds two times the velocity of the path length fluctuation of the reference light divided by the wavelength of the reference light.

5. The method of claim 1 wherein accumulating an unwrapped phase difference includes
   detecting a change in sign of the optical phase difference;
   incrementing a counter by one in response to detecting a change in sign of the optical phase difference from a positive value to a negative value; and
   decrementing the counter by one in response to detecting a change in sign of the optical phase difference from a negative value to a positive value.

6. The method of claim 1 further comprises accumulating the unwrapped phase difference using a field-programmable gate array.

7. The method of claim 1 wherein the path length fluctuation of the reference light is determined by multiplying the unwrapped phase difference by the wavelength of the reference light and dividing the product by two times pi.

8. The method of claim 1 further comprises
   injecting, by a light source different than the reference laser, a second measurement beam along both paths of the interferometer;
   measuring interference between the second measurement beams at an output of the interferometer; and
   determining a measurement signal using both the interference between the second measurement beams and the path length fluctuations of the reference light.

9. The method of claim 8 wherein determining the measurement signal includes calculating phase fluctuations of the measurement signal using phase fluctuations of the reference light.

10. A spectroscopy system, comprising:
    an interferometer having a frequency modulator in one of two optical paths;
    a reference laser source configured to inject reference light along the two optical paths of the interferometer;
    a detector configured to measure interference between the reference light at an output of the interferometer;
    a signal processor interfaced with the detector, the signal processor configured to
    measure the intensity modulation resulting from the interference between the reference light to produce an electronic signal,
    subtract phase of an applied frequency modulation from the electronic signal to determine an optical phase difference between the reference light in the two optical paths of the interferometer,
    accumulate an unwrapped phase difference between the reference light in the two optical paths of the interferometer, and
    determine path length fluctuation of the reference light in the interferometer using the unwrapped phase difference.

11. The spectroscopy system of claim 10 wherein the detector measures interference between the reference light at a sampling rate that exceeds acoustic noise.

12. The spectroscopy system of claim 10 wherein the detector measures interference between the reference light at a sampling rate that exceeds two times the velocity of the path length fluctuation of the reference light divided by the wavelength of the reference light.

13. The spectroscopy system of claim 10 wherein the signal processor accumulates an unwrapped phase difference by
    detecting a change in sign of the optical phase difference;

incrementing a counter by one in response to detecting a change in sign of the optical phase difference from a positive value to a negative value; and decrementing the counter by one in response to detecting a change in sign of the optical phase difference from a negative value to a positive value.

14. The spectroscopy system of claim 10 wherein the signal processor is a field-programmable gate array.

* * * * *